Feb. 9, 1971
R. ERNST
3,561,048
METHOD AND APPARATUS FOR PRODUCING HOLLOW BODIES BY MEANS
OF FOAMABLE SUBSTANCES, PARTICULARLY WITH POLYURETHANE
Filed July 31, 1968
2 Sheets-Sheet 1
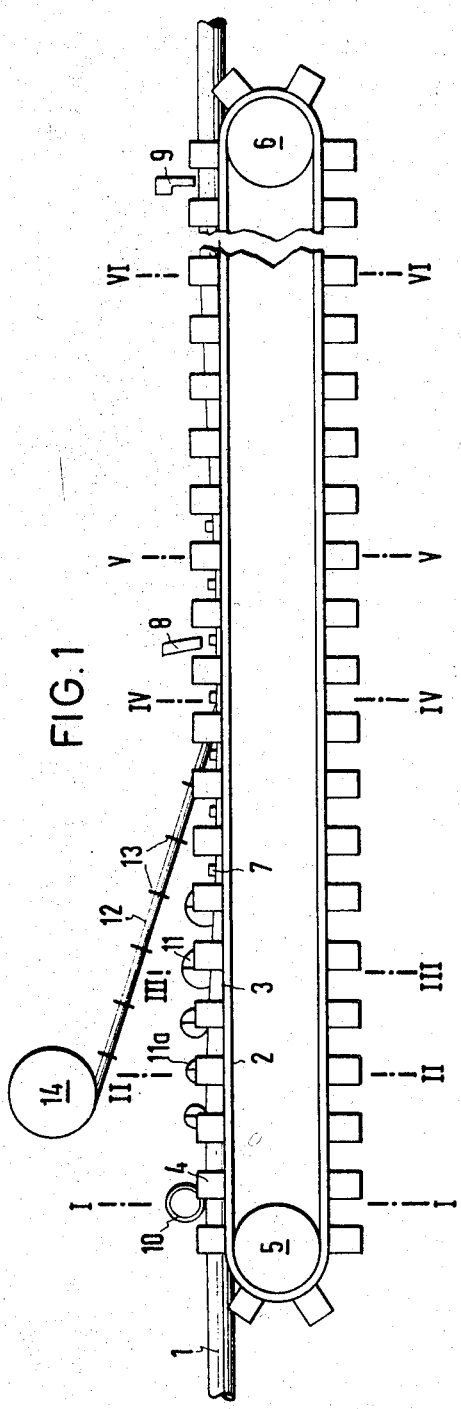
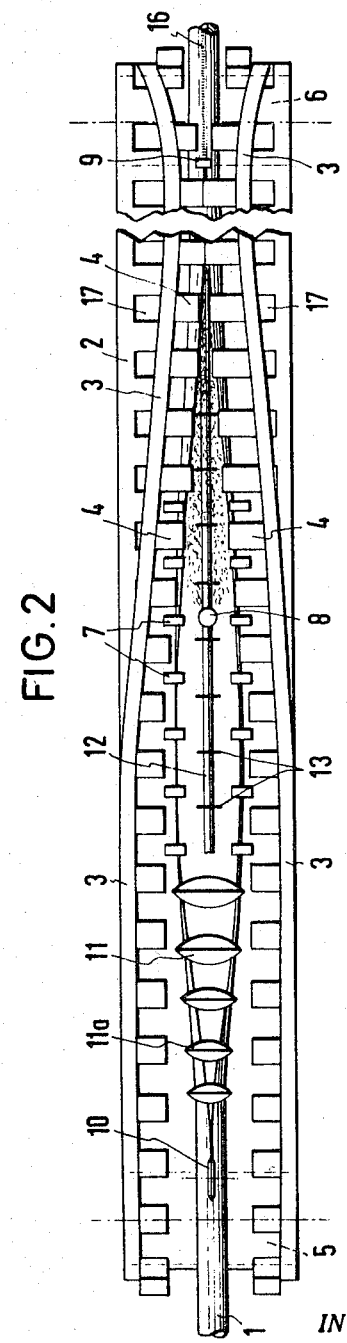
INVENTOR.
RUDOLF ERNST
BY *Robert K. Jacot*
AGT.

Feb. 9, 1971  R. ERNST  3,561,048
METHOD AND APPARATUS FOR PRODUCING HOLLOW BODIES BY MEANS
OF FOAMABLE SUBSTANCES, PARTICULARLY WITH POLYURETHANE
Filed July 31, 1968  2 Sheets-Sheet 2

INVENTOR.
RUDOLF ERNST

BY *Robert K. Jacob*

AGT.

United States Patent Office 3,561,048
Patented Feb. 9, 1971

3,561,048
METHOD AND APPARATUS FOR PRODUCING HOLLOW BODIES BY MEANS OF FOAMABLE SUBSTANCES, PARTICULARLY WITH POLYURETHANE
Rudolf Ernst, Strasslach, near Munich, Germany, assignor to Maschinenfabrik Hennecke Gesellschaft mit beschrankter Haftung, Leverkusen, Germany
Filed July 31, 1968, Ser. No. 749,129
Claims priority, application Germany, July 31, 1967, P 17 04 842.9
Int. Cl. B29d 3/00, 23/00
U.S. Cl. 18—4      16 Claims

ABSTRACT OF THE DISCLOSURE

A method and apparatus for the continuous production of hollow bodies that are enclosed in foamable substances such as polyurethane, where a core tube (12) is coated with foamable material inside a covering tube (1) that is slit open in longitudinal direction, and the open covering tube is shaped around the foamed material to constitute a closed tubular body.

BACKGROUND OF THE INVENTION

The present invention concerns a method and apparatus for the production of hollow bodies made of foamable material. More in particular, the invention relates to the continuous production of hollow or tubular bodies from foamable substances, particularly bodies covered with polyurethane, and an apparatus for carrying out the method.

A method for the continuous production of hollow bodies made from foamable substances has not been known heretofore. The continuous production of plates, sheets and foils of foamable substances, particularly of substances on a polyurethane base is known. In this method, the foamable substance is introduced between two oppositely disposed conveyor bands that are moved essentially at a speed that corresponds to the reaction speed and is there caused to foam. The foaming space between the conveyor bands is laterally limited by strips that move along with the conveyor bands or by stationary strips or rails.

Furthermore, it is known to produce short hollow bodies that are not endless out of foamable substances with the conventional form casting method. The shaping of these short hollow bodies to constitute elongated tubular bodies is costly, difficult, and uneconomical.

SUMMARY OF THE INVENTION

It is an object of the invention to provide a method of the type mentioned above. This object is achieved in accordance with the invention in that a core tube is covered with a foamable substance inside a covering tube that is open in the longitudinal direction and the open covering tube is shaped around the framed material to constitute a closed tubular body.

In this manner, it is possible to continuously produce closed tubular bodies which comprise, for example, an inner tube for carrying a liquid or a heating or cooling agent, a coating insulating and carrying this inner tube, and an outer protective tube. In carrying out the method in accordance with the invention, the protective or covering tube serves at the same time as the container into which the foamable substance can be introduced.

Advantageously, the covering tube can be slit open in the longitudinal direction immediately after it has been produced by means of an extruder or the like, bent open to form a half shell, and then be deformed after the introduction of the core tube and of the foamable substance to make a closed tubular body, and in a given case welded at the abutting edges of the slit.

The forming of the covering tube into a tubular body can be effected in closed form while moving continuously in which condition the foaming is also carried out by taking advantage of the closed form.

In a most advantageous manner the method in accordance with the invention makes possible the continuous production of closed insulated tubular bodies which, in addition, are provided with a protective hull which is simultaneously utilized in an advantageous manner for carrying out the method. The foaming of the insulating or coating material takes place in the covering or protective tube, that is slit open in longitudinal direction and is held open long enough for the foamable substance and the inner or core tube to be introduced, and which then is again formed to constitute a closed tubular body.

The seam that remains at the abutting edges of the slit can advantageously be welded when the adhesion effect between the foamable substance and the covering tube is not sufficient to insure the desired quality of the seam.

In an advantageous manner the foaming and the closing of the covering tube to form a tubular body in a form or mold moving continuously with the tube can take place if the bent open covering tube does not re-close itself by its inherent tension. Also for attaining a high grade, accurately dimensioned end product, the form may be used in an advantageous manner.

What is essential is that the slit open and bent open covering tube is re-closed after the introduction of the core tube and of the foamable substance, which can be carried out by the form, or forms moving along, as well as also by a suitable formed stationary support arranged alongside.

Advantageously, the apparatus for carrying out the method in accordance with the invention comprises a conveyor by means of which the opened covering tube is movable in longitudinal direction, and on which also the form or forms are arranged. A conveyor of this type which moves at a velocity which is adapted to the reaction velocity of the foamable substance and to the length fed in, constitutes a suitable means for moving the covering tube and the forms, and to move along therewith the foamable substance and the core tube that has been fed in.

Advantageously, each form or mold is sub-divided into two form halves, each of which is adapted with its inner surface to a cross-sectional half of the tubular body to be produced and which is arranged for sliding perpendicularly with respect to the conveying direction of the conveyor and guided by a constraining guide means in order to act upon the covering tube in such a manner that the covering tube at any time has a shape that is adapted to the stage to which the method has progressed at the moment.

For cutting open a covering tube that has been produced immediately preceding in an extruder, a suitable device may be provided at the beginning of the conveyor which is followed in the direction of conveying by a pressing device for bending open the slit covering tube, which pressing device is followed by depressers for the pressed on covering tube which hold the covering tube open until the core tube and the foamable material have been introduced.

Advantageously, the constraining guide means for the form halves are arranged and shaped in a manner that they guide the covering tube after being pressed on, and after the insertion of the core tube and of the foamable substance, press them together to form a closed tubular body in which foaming then takes place. With suitable dimensions and proper guiding of the covering tube and the form halves, the form halves can at the same time take on the task of the depressers for holding down the material being formed so that depressers are not necessary. In that event the guide means and the shape thereof must, of course, be adapted to the form halves and to this additional task.

Advantageously, the constraining guide means may be in the form of two laterally disposed stationary rails which press together the form halves after feeding in the core tube and the foamable substance in order to close the covering tube.

The pressing device is advantageously constituted by rotatably journalled rollers that are disposed in sequence in the direction of conveying the effective profiles of which are adapted to the form of the covering tube or of the slit in order to insure that the fed in covering tube which was previously opened or introduced in slit condition is pressed on. The rollers may, for example, be wedge-shaped or rounded.

When depressers are used in order to hold the bent-open or spread-out covering tube in its opened shape after it leaves the pressing devices, these devices can be arranged on separate additional conveyors which bring the depressers after the covering tube is pressed open into engagement with the same, and after the insertion of the core tube and of the foamable material disengage them. The movement of the additional conveyors must be adapted to the movement of the main conveyor and to the method proper, i.e., they must be suitably synchronized.

In order that the core tube may be properly centered in the final product, or arranged in any other desired manner inside the covering tube, it can be advantageous if spacers are placed upon the core tubes in order to insure the desired arrangement of the core tube in relation to the cross section of the final product. These spacers may, furthermore, constitute an additional support means for the core tube in the end product thus produced, when the enclosing or covering foamed material is insufficient for carrying the core tube.

Advantageously, the composition of the spacers is adapted to or corresponds to that of the foamed substance in order to ascertain of a homogeneous covering that will provide, for example, equal insulating characteristics.

In an advantageous manner, the spacers may be slit in order to place them on the core tube in which connection the slitting may be effected automatically with the aid of a suitable apparatus.

The core tube used has properties which are adapted to the ultimate use of the tubular body produced in accordance with the method of the invention. The core tube may be an elastic flexible tube of plastic or the like which is pulled from a feeding roller. Also, a stiff tube may be used which, however, is not pulled from a supply roller and which may, for example, be made of metal. In that case, the endless core tube is taken from individual tube sections of definite length from a supply table and assembled by suitable connecting elements or in any other manner. Thereupon, the introduction into the covering tube may take place. It is, of course, also possible to place spacers upon such a stiff core tube.

The form halves may be forced by a pressure means against the constraining guide means in order to insure of accurate guiding in direct relation to the constraining guide means. These pressure means may be defined by pressure springs which are arranged between the form halves, while a space is provided in the form halves which accommodates the springs in the closed position of the form halves and thus does not impede the movability of the form halves.

The form halves may be guided in the most different manner, while moving transversely of the direction of movement of the conveyor. This guiding may be by means of transverse slots in the conveyor guide tracks arranged upon the conveyor or by guide rails arranged on the conveyor, which in turn cooperate with transverse grooves in the bottom side of the form halves.

The form halves, as well as also the depressers may be interchangeable and adjustable at their corresponding conveyors, in order to make possible the production of tubular bodies of the most different shapes.

Also the constraining guide means may be adjustable and displaceable in order to insure of universal adaptability.

It is not necesary to provide the constraining guide means along the entire path of the form halves along the conveyor because the form halves can also rest against abutments if their position does not have to be changed in relation to the cover tube. These abutments may, for example, also be constituted by the end of the transverse slot in the conveyor.

BRIEF DESCRIPTION OF THE DRAWINGS

Further advantages and details of the invention will become apparent from the accompanying drawings, which illustrate an embodiment of an apparatus for carrying out of the process in accordance with the invention, and in which FIG. 1 is a side view of the apparatus for carrying out the process in accordance with the invention;

FIG. 2 is a top view of the apparatus shown in FIG. 1;

DESCRIPTION OF THE INVENTION

Figure 3:
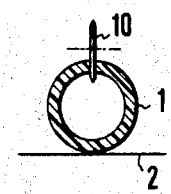
FIG. 3 is a cross section taken along line I in FIG. 1 through the covering tube in an early stage of production.

The apparatus for carrying out the process in accordance with the invention as shown in FIGS. 1 and 2 in an embodiment illustrated with parts cut away consists of an endless, circulating conveyor belt 2, upon which a covering tube 1 is placed, which may be previously produced by an extruder. Upon the conveyor 2 are fastened the form halves 4 whose inner space is adapted to the dimensions of the covering tube 1 or to the exterior dimensions of the tubular body to be produced and are arranged for lateral displacement in transverse slots 17 of the conveyor 2, as clearly shown in FIGS. 5, 7 and 8.

Figure 4:
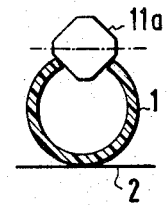
FIG. 4 is a cross section through the covering tube at a subsequent stage of production taken along line II in FIG. 1, in which the forced opening of the covering tube takes place.

If the covering tube 1 has not already been opened and formed prior to this stage, then it is slit by a cutting device 10 and thereafter it is pressed and bent open by suitably arranged rollers 11. The form of the rollers 11 is adapted to the special task of each roller, which will become apparent upon analysis of FIGS. 4 and 5, which show that roller 11a has a different shape than roller 11. These forms are adapted to the step in the process at all times and to the shape of the covering tube 1.

Figure 6:
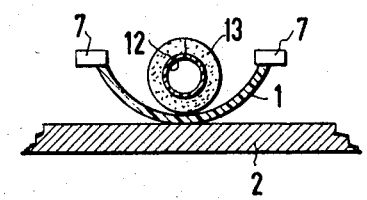
FIG. 6 is a section taken along line IV of FIG. 1 through essential parts of the production equipment in which the engagement of the retainers with the covering tube and the core tube with its spacers is illustrated.

After pressing open the covering tube 1 with the rollers 11, the retaining devices 7 which may be arranged on lateral conveyors (not illustrated) become operative. The core tube 12 is now introduced from the top into the opened cover tube by means of spacers 13 positioned with the aid of slits as shown, for example, in FIG. 6. If suitable, the core tube may be pulled from a supply roller 14. After introducing the covering tube, the introduction of the foamable substance can take place from a mixing and dosing device 8 into the shell formed by the covering tube. After introducing the foamable substance, the holders 7 are made to disengage the covering tube 1 and the form halves are moved inwardly by stationary constraining guide means 3 in the form of rails or the like in order to press together the covering tube, and in this manner to create a closed space for the foaming and simultaneously to impart to the covering tube the desired shape of the tubular body that is being produced.

As shown in FIGS. 1 and 2, the apparatus in accordance with the invention may be longer in the area of the foaming in order to make available a sufficiently long hardening period for the foamable material. This depends on the recipe and on the different other factors that affect the foamable material.

Toward the end of the production process, the covering tube is re-closed at the original seam by a welding device 9.

Figure 7:
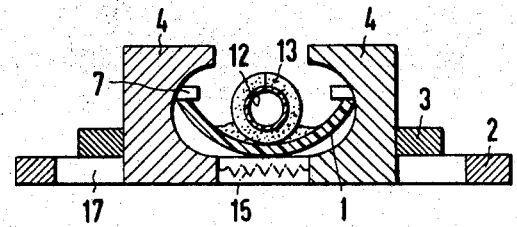
FIG. 7 is a section along line V of FIG. 1 at a further stage of the method in accordance with the invention.

FIG. 7 illustrates the covering tube 1 which forms a shell for the foamable substance in engagement with the depressers 7, where the movement of the form halves inwardly has already started because the withdrawing of the retainers is immediately impending. This movement is accomplished by the stationary constraining guides 3 and takes place against the effect of a pressure spring 15.

Figure 8:
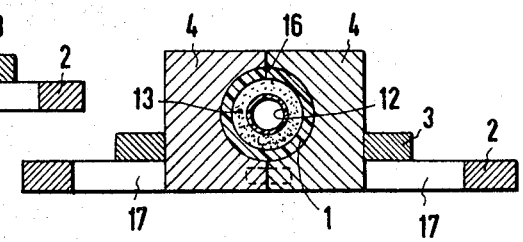
FIG. 8 is a section along line VI of FIG. 1 through essential parts of the installation toward the end of the final production stage.

FIG. 8 shows the form halves completely closed and the spring 15 is accommodated in a space in the lower part of the form halves in order not to interfere with the movements of the form halves in the slots 17. FIG. 8 also shows that the covering tube initially slit open at 10 has resumed its original shape, i.e., the slit edges constitute a seam 16.

Figure 5:
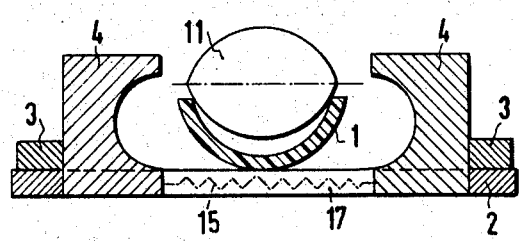
FIG. 5 is a section taken along line III of FIG. 1 through essential parts of the production equipment in which the covering tube has been fully forced open.
Figure 9:
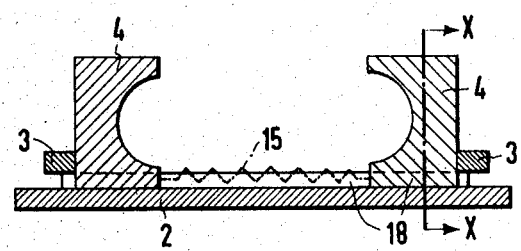
FIG. 9 is a section similar to that of FIG. 5, where the form halves are guided on the conveyor by a track and groove connection instead of in a transverse slot in the conveyor.
Figure 10:
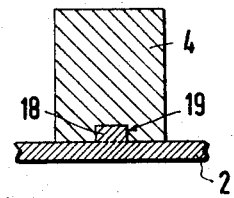
FIG. 10 is a section along line X—X in FIG. 9.

FIG. 9 illustrates another embodiment which differs from that of FIG. 5 in that the form halves 4 are guided on transversely extending tracks 18 on the conveyor 2. Each form half 4 has a groove 19 in engagement with the track 18 as shown in FIG. 10.

FIG. 5 makes it apparent that the guidance of the form halves may be eliminated also in this case because they are in lateral engagement at the end of the transverse slots in the conveyor 2.

After the tubular body thus produced emerges from the apparatus in accordance with the invention, we again have a closed hollow tubular body which comprises an inner core tube 12 and a protective or outer tube 1, while the space between these tubes is filled with the foamed substance. Inasmuch as the spacers 13 correspond to the foamed material, they constitute a homogeneous part of the insulating material.

The spacers may, of course, also be made of a different material, for example, when it is desired in heavy core tubes that they support the carrying effect of the foamed material also after setting.

Having now described my invention with reference to the embodiments illustrated in the drawings, I do not wish to be limited thereto, but what I desire to protect by Letters Patent is set forth in the appended claims.

I claim:

1. Apparatus for the continuous production of hollow bodies in the form of an inner core tube encompassed by a foamed substance, for example polyurethane, surrounded by a covering tube, said apparatus comprising a main conveyor, form means mounted on and movable with said main conveyor adapted to receive for engagement thereby a split covering tube having longitudinal edges, means for feeding a core tube to said main conveyor and onto the slit covering tube and means for supplying foamable material to be foamed around the core tube, intermediate the core tube and said covering tube, said form means comprising a plurality of forms, each divided into form halves, each having an inner surface corresponding to one half the outer surface of the tubular body to be produced and each being slidably mounted on said main conveyor for sliding movement transversely of the direction of conveyor movement and constraining guides disposed on both sides of said main conveyor for guiding and controlling the transverse sliding movement of said form halves.

2. Apparatus in accordance with claim 1, including in sequence a slitting device at the entrance end of said main conveyor for slitting said covering tube longitudinally, separating devices for opening said slit covering tube arranged intermediate said form halves and depressers for keeping open said separated covering tube until the core tube and the foamable material have been introduced.

3. Apparatus in accordance with claim 1 where said constraining guides are adapted to direct said form halves toward said separated covering tube and upon introduction of said core tube and said foamable substance to move together the longitudinal edges of said covering tube to form a closed tubular body in which the foamable substance is foamed.

4. Apparatus in acocrdance with claim 3, where said constraining guides are stationary rails disposed along both sides of said main conveyor, said rails having portions approaching one another whereby said form halves are brought into contact, thereby bringing together the longitudinal edges of said covering tube.

5. Apparatus in accordance with claim 2, where said separating devices are rollers rotatably journalled perpendicularly to the direction of the conveyor movement, said rollers having profiles varying in accordance with the spacing between the longitudinal edges of said covering tube.

6. Apparatus in accordance with claim 2, including a second conveyor means arranged parallel to said main conveyor, said depressers being mounted on said second conveyor for retaining the edges of the opened covering tube until said core tube and the foamable material have been introduced.

7. Apparatus in accordance with claim 5 including spacers mounted on the core tube, said spacers having a cross section corresponding to the cross section of the inner space of said covering tube and having a composition adapted to the composition of the foamed material.

8. Apparatus in accordance with claim 7, where said spacers are split for placing them upon the core tube.

9. Apparatus in accordance with claim 1 including a supply roller for said core tube for dispensing said core tube and said core tube being of elastic material.

10. Apparatus in accordance with claim 1, where said core tube is stiff and provided with spacers for insertion in said opened covering tube.

11. Apparatus in accordance with claim 1, including a welding means at the delivery end of said main conveyor for welding together the longitudinal edges of said covering tube.

12. Apparatus in accordance with claim 5, including pressure means intermediate said form halves operative to bias said form halves against said constraining guides.

13. Apparatus in accordance with claim 12, where said pressure means are springs and said form halves are provided with cavities adapted to receive said springs in the closed position of said form halves.

14. Apparatus in accordance with claim 1, where said main conveyor presents guiding slots for said form halves.

15. Apparatus in accordance with claim 1, where said form halves are provided with transverse slots and said conveyor has transverse guide ledges for engaging said slots.

16. Apparatus in accordance with claim 1, where said constraining guides are arranged along that portion of said main conveyor where said form halves are moved towards each other to bring together the edges of said covering tube.

References Cited

UNITED STATES PATENTS

| | | | |
|---|---|---|---|
| 2,141,405 | 12/1938 | Randall | 18—4 |
| 2,210,000 | 8/1940 | Peel | 18—6X |
| 2,817,875 | 12/1957 | Harris et al. | 18—4 |
| 3,325,573 | 6/1967 | Boon et al. | 18—4X |
| 3,382,303 | 5/1968 | Stieg | 18—4X |

JAMES M. MEISTER, Primary Examiner